(12) United States Patent
Ohnemus

(10) Patent No.: US 11,703,150 B2
(45) Date of Patent: Jul. 18, 2023

(54) FITTING FOR BRACE MEMBER

(71) Applicant: ASC Engineered Solutions, LLC, Portsmouth, NH (US)

(72) Inventor: Gregory Nicholas Stagliano Ohnemus, Providence, RI (US)

(73) Assignee: ASC Engineered Solutions, LLC, Portsmouth, NH (US)

( * ) Notice: Subject to any disclaimer, the term of this patent is extended or adjusted under 35 U.S.C. 154(b) by 0 days.

(21) Appl. No.: 17/333,391

(22) Filed: May 28, 2021

(65) Prior Publication Data

US 2021/0285572 A1    Sep. 16, 2021

Related U.S. Application Data

(63) Continuation of application No. 16/793,029, filed on Feb. 18, 2020, now Pat. No. 11,060,638, which is a continuation of application No. 16/107,297, filed on Aug. 21, 2018, now Pat. No. 10,605,382.

(51) Int. Cl.
*F16L 3/16* (2006.01)
*F16L 3/10* (2006.01)

(52) U.S. Cl.
CPC .............. *F16L 3/16* (2013.01); *F16L 3/1091* (2013.01)

(58) Field of Classification Search
CPC . F16L 3/16; F16L 3/1091; F16B 2/065; F16B 5/0291; B21D 28/00; B21D 28/002; B25B 5/10; B25B 5/101
See application file for complete search history.

(56) References Cited

U.S. PATENT DOCUMENTS

| | | | |
|---|---|---|---|
| 763,987 A | 7/1904 | Kriebel | |
| 981,470 A | 1/1911 | Postel | |
| 2,339,093 A | 1/1944 | Metheny | |
| 2,439,063 A | 4/1948 | Shur | |
| 2,470,309 A | 5/1949 | Hepp | |
| 2,470,992 A | 5/1949 | Kindorf et al. | |
| 2,678,786 A | 5/1954 | Kindorf | |
| 2,865,587 A | 12/1958 | D'Azzo | |
| 2,931,605 A | 4/1960 | Kelly | |
| 3,129,915 A * | 4/1964 | Budnick | F16L 3/24 248/72 |

(Continued)

OTHER PUBLICATIONS

Ohnemus, Gregory Nicholas Stagliano; Corrected Notice of Allowance for U.S. Appl. No. 16/117,835, filed Aug. 20, 2018, dated Sep. 15, 2020, 6 pgs.

(Continued)

*Primary Examiner* — Christopher Garft
(74) *Attorney, Agent, or Firm* — Taylor English Duma LLP

(57) ABSTRACT

A fitting for engaging a brace member can include a fitting body defining a body opening extending laterally therethrough, the fitting body further defining a top contact surface and a bottom contact surface; a first jaw connected to the fitting body at a proximal first jaw end, the first jaw oriented perpendicular to the body opening; a second jaw connected to the fitting body at a proximal second jaw end, a the second jaw perpendicular to the body opening and disposed between the top contact surface and the bottom contact surface, wherein the top contact surface extends between the proximal first jaw end and the proximal second jaw end; and a slot defined between the first jaw and the second jaw.

15 Claims, 9 Drawing Sheets

(56) References Cited

U.S. PATENT DOCUMENTS

| | | | |
|---|---|---|---|
| 3,146,982 A * | 9/1964 | Budnick | F16L 3/24 |
| | | | 24/135 R |
| 3,266,762 A | 8/1966 | Evans | |
| 3,321,161 A * | 5/1967 | Hirt | F16L 3/24 |
| | | | 248/327 |
| 3,341,909 A | 9/1967 | Havener et al. | |
| 3,528,634 A | 9/1970 | Jenkins | |
| 3,563,504 A | 2/1971 | Gordon et al. | |
| 3,572,623 A | 3/1971 | Lapp | |
| 3,902,931 A | 9/1975 | Danciger et al. | |
| 4,006,874 A | 2/1977 | McGee | |
| 4,063,334 A | 12/1977 | Rohman | |
| 4,244,545 A | 1/1981 | Berry | |
| 4,306,696 A | 12/1981 | Pondman | |
| 4,570,885 A | 2/1986 | Heath | |
| 4,697,770 A | 10/1987 | Kirschner | |
| 5,004,193 A | 4/1991 | Kirschner | |
| 5,197,819 A | 3/1993 | Hughes | |
| 5,330,139 A | 7/1994 | Tietje | |
| 5,630,576 A * | 5/1997 | Williams | B25B 5/147 |
| | | | 269/45 |
| 5,730,402 A | 3/1998 | Sallen | |
| 5,947,424 A | 9/1999 | Heath | |
| 6,098,942 A | 8/2000 | Heath | |
| 6,273,372 B1 * | 8/2001 | Heath | F16L 3/243 |
| | | | 248/62 |
| 6,508,442 B1 | 1/2003 | Dolez | |
| 6,898,905 B1 | 5/2005 | Kirschner | |
| 7,137,606 B2 | 11/2006 | Conway et al. | |
| 7,467,765 B2 | 12/2008 | Heath | |
| 7,654,043 B2 | 2/2010 | Heath | |
| 7,722,014 B2 | 5/2010 | Godwin | |
| 8,070,113 B1 | 12/2011 | Kirschner | |
| 8,132,767 B2 | 3/2012 | Oh et al. | |
| 8,726,607 B1 | 5/2014 | Kirschner | |
| 8,800,938 B2 | 8/2014 | Heath | |
| 8,857,771 B2 | 10/2014 | Streetman | |
| 8,881,348 B2 | 11/2014 | Teranishi | |
| 8,882,056 B2 | 11/2014 | Greenfield | |
| 8,894,023 B2 | 11/2014 | Dann | |
| 8,905,693 B2 | 12/2014 | Coffland et al. | |
| RE45,825 E | 12/2015 | Magno, Jr. et al. | |
| 9,464,665 B2 | 10/2016 | Heath | |
| 9,592,919 B2 | 3/2017 | Leachman | |
| 9,683,681 B2 | 6/2017 | Heath et al. | |
| 9,777,870 B2 | 10/2017 | Roth | |
| 10,100,973 B2 * | 10/2018 | Anderson | F16M 13/02 |
| 10,605,382 B2 | 3/2020 | Ohnemus | |
| 10,668,878 B1 | 6/2020 | Sampson | |
| 10,816,108 B2 | 10/2020 | Ohnemus | |
| 11,028,945 B2 | 6/2021 | Ohnemus | |
| 11,060,638 B2 | 7/2021 | Ohnemus | |
| 11,274,771 B2 | 3/2022 | Geppert et al. | |
| 11,421,802 B2 | 8/2022 | Ohnemus | |
| 2004/0031887 A1 | 2/2004 | Heath | |
| 2004/0031896 A1 | 2/2004 | Heath | |
| 2004/0195479 A1 | 10/2004 | Gulley | |
| 2006/0024127 A1 | 2/2006 | Heath | |
| 2009/0183463 A1 | 7/2009 | Osborn et al. | |
| 2010/0207311 A1 | 8/2010 | Smith et al. | |
| 2013/0153737 A1 | 6/2013 | Zoeteman | |
| 2013/0214098 A1 | 8/2013 | Greenfield | |
| 2015/0252915 A1 * | 9/2015 | Heath | F16L 3/08 |
| | | | 248/62 |
| 2015/0252916 A1 | 9/2015 | Heath et al. | |
| 2015/0291290 A1 | 10/2015 | Leachman | |
| 2016/0208838 A1 * | 7/2016 | Allmon | F16B 2/065 |
| 2016/0252197 A1 | 9/2016 | Roth | |
| 2016/0318624 A1 | 11/2016 | Skibba et al. | |
| 2017/0336021 A1 * | 11/2017 | Anderson | F16M 13/022 |
| 2020/0063898 A1 | 2/2020 | Ohnemus | |
| 2020/0072393 A1 | 3/2020 | Ohnemus | |
| 2020/0182380 A1 | 6/2020 | Ohnemus | |
| 2020/0284378 A1 | 9/2020 | Ohnemus | |
| 2021/0247001 A1 | 8/2021 | Ohnemus | |
| 2022/0316647 A1 | 10/2022 | Krämer et al. | |
| 2022/0341512 A1 | 10/2022 | Ohnemus | |

OTHER PUBLICATIONS

Ohnemus, Gregory Nicholas Stagliano; Corrected Notice of Allowance for U.S. Appl. No. 16/117,835, filed Aug. 30, 2018, dated Aug. 17, 2020, 6 pgs.

Ohnemus, Gregory Nicholas Stagliano; Final Office Action for U.S. Appl. No. 16/117,835, filed Mar. 30, 2018, dated Mar. 23, 2020, 19 pgs.

Ohnemus, Gregory Nicholas Stagliano; Non-Final Office Action for U.S. Appl. No. 16/117,835, filed Mar. 30, 2018, dated Oct. 7, 2019, 20 pgs.

Ohnemus, Gregory Nicholas Stagliano; Non-Final Office Action for U.S. Appl. No. 16/117,835, filed Mar. 30, 2018, dated May 11, 2020, 14 pgs.

Ohnemus, Gregory Nicholas Stagliano; Notice of Allowance for U.S. Appl. No. 16/117,835, filed Mar. 30, 2018, dated Jun. 2, 2020, 7 pgs.

Ohnemus, Gregory Nicholas Stagliano; Corrected Notice of Allowance for U.S. Appl. No. 16/878,483, filed May 19, 2020, dated May 11, 2021, 6 pgs.

Ohnemus, Gregory Nicholas Stagliano; Final Office Action for U.S. Appl. No. 16/878,483, filed May 19, 2020, dated Nov. 16, 2020, 21 pgs.

Ohnemus, Gregory Nicholas Stagliano; Non-Final Office Action for U.S. Appl. No. 16/878,483, filed May 19, 2020, dated Aug. 13, 2020, 12 pgs.

Ohnemus, Gregory Nicholas Stagliano; Notice of Allowance for U.S. Appl. No. 16/878,483, filed May 19, 2020, dated Feb. 2, 2021, 12 pgs.

Ohnemus, Gregory Nicholas Stagliano; Requirement for Restriction/Election for U.S. Appl. No. 16/878,483, filed May 19, 2020, dated Jun. 26, 2020, 5 pgs.

Eaton; Product Catalog for Seismic Bracing TOLCO™ Fig. 980—Universal Swivel Sway Brace Attachment—3/8"-to ¾"—10 rods and TOLCO™ Fig. 980H—Universal Swivel Sway Brach Attachment—7/8/"-9 to 1 ¼"—7 rods, publicly available prior to Mar. 13, 2018, 1 pg.

Nusig / Badger Industries; Installation Detail for SSC Seismic Hardware, publicly available prior to Mar. 13, 2018, 1 pg.

Nusig / Badger Industries; Installation Detail for SVC & SBEMT Seismic Hardware, publicly available prior to Mar. 13, 2018, 3 pgs.

Nvent; Product Catalog for Universal Structural Bracket (CSBU1), publicly available prior to Mar. 13, 2018, 2 pgs.

Nvent; Product Catalog for Universal Structural Bracket (CSBU2), publicly available prior to Mar. 13, 2018, 2 pgs.

Ohnemus, Gregory Nicholas Stagliano; Final Office Action for U.S. Appl. No. 16/107,297, filed Mar. 21, 2018, dated Oct. 31, 2019, 10 pgs.

Ohnemus, Gregory Nicholas Stagliano; Non-Final Office Action for U.S. Appl. No. 16/107,297, filed Mar. 21, 2018, dated Jun. 27, 2019, 12 pgs.

Ohnemus, Gregory Nicholas Stagliano; Notice of Allowance for U.S. Appl. No. 16/107,297, filed Mar. 21, 2018, dated Dec. 16, 2019, 8 pgs.

Pentair; Product Catalog for Universal Structural Attachment Fitting (CSBUNIV), copyright 2009-2017, 9 pgs.

PHD Manufacturing, Inc.; Product Catalog for Seismic Bracing C-Clamp Structural Attachment, publicly available prior to Mar. 13, 2018, 2 pgs.

Ohnemus, Gregory Nicholas Stagliano; Final Office Action for U.S. Appl. No. 16/793,029, filed Feb. 18, 2020, dated Jan. 7, 2021, 10 pgs.

Ohnemus, Gregory Nicholas Stagliano; Non-Final Office Action for U.S. Appl. No. 16/793,029, filed Feb. 18, 2020, dated Nov. 16, 2020, 19 pgs.

Ohnemus, Gregory Nicholas Stagliano; Non-Final Office Action for U.S. Appl. No. 16/793,029, filed Feb. 18, 2020, dated Sep. 3, 2020, 24 pgs.

(56) References Cited

OTHER PUBLICATIONS

Ohnemus, Gregory Nicholas Stagliano; Notice of Allowance for U.S. Appl. No. 16/793,029, filed Feb. 18, 2020, dated Mar. 10, 2021, 13 pgs.

Ohnemus, Gregory Nicholas Stagliano; Supplemental Notice of Allowance for U.S. Appl. No. 16/793,029, filed Feb. 18, 2020, dated Apr. 28, 2021, 7 pgs.

Ohnemus, Gregory Nicholas Stagliano; Supplemental Notice of Allowance for U.S. Appl. No. 16/793,029, filed Feb. 18, 2020, dated Jun. 14, 2021, 7 pgs.

Ohnemus, Gregory Nicholas Stagliano; Non-Final Office Action for U.S. Appl. No. 17/245,567, filed Apr. 30, 2021, dated Oct. 20, 2021, 23 pgs.

Ohnemus, Gregory Nicholas Stagliano; Notice of Allowance for U.S. Appl. No. 17/245,567, filed Apr. 30, 2021, dated Apr. 11, 2022, 7 pgs.

Ohnemus, Gregory Nicholas Stagliano; Non-Final Office Action for U.S. Appl. No. 17/862,105, filed Jul. 11, 2022, dated Nov. 28, 2022, 26 pgs.

\* cited by examiner

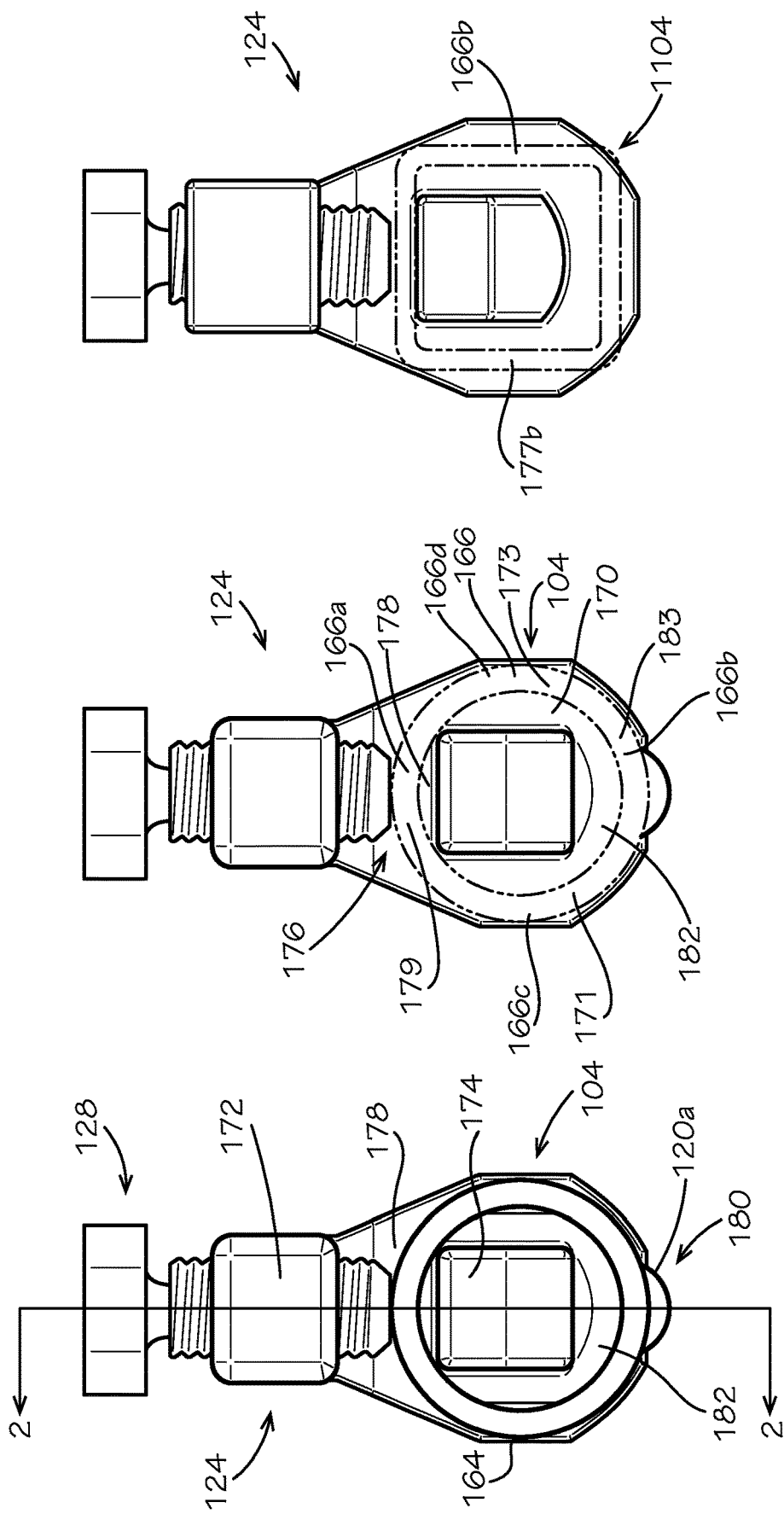

FITTING FOR BRACE MEMBER

CROSS-REFERENCE TO RELATED APPLICATIONS

The present application is a continuation of U.S. application Ser. No. 16/793,029, filed Feb. 18, 2020, which is a continuation of U.S. application Ser. No. 16/107,297, filed Aug. 21, 2018, which issued into U.S. Pat. No. 10,605,382 on Mar. 31, 2020, both of which are hereby specifically incorporated by reference herein in their entireties.

TECHNICAL FIELD

This disclosure relates to fittings. More specifically, this disclosure relates to a fitting for concentrically loading a brace member.

BACKGROUND

Piping systems, such as fire sprinkler system piping and HVAC piping, can be mounted in a structure (e.g., a building) using various types of pipe support assemblies (e.g., hangers, stanchions, slides, guides, seismic braces, rollers, etc.). Some piping systems are subject to dynamic loads (e.g., seismic loads from an earthquake or settling of the structure). Piping support assemblies can employ a seismic brace assembly to allow for movement of the piping system along with the structure in response to dynamic loads.

The seismic brace assembly can include a brace member. The brace member can be a hollow pipe comprising a cylindrical wall with open ends. One end of the brace member can be attached to the structure and the other end of the brace member can be attached to the piping system. A jaw-type seismic fitting can be used to attach the brace member to the piping system, the structure, and/or a mounting mechanism for mounting the support assembly to the structure. Typical jaw-type fittings engage only one side of a peripheral edge of the cylindrical wall (e.g. a top side). Engaging the brace member at only one side of the peripheral edge can restrict the load-carrying capability of the brace member and can create an undesirable eccentric or torsional force on the brace member and/or an undesirable prying or twisting force on the mounting mechanism, the fitting, and/or the structure.

SUMMARY

It is to be understood that this summary is not an extensive overview of the disclosure. This summary is exemplary and not restrictive, and it is intended neither to identify key or critical elements of the disclosure nor delineate the scope thereof. The sole purpose of this summary is to explain and exemplify certain concepts off the disclosure as an introduction to the following complete and extensive detailed description.

Disclosed is a fitting for engaging a brace member, the fitting comprising a fitting body; a first jaw extending from the fitting body; a second jaw extending from the fitting body, the first jaw and second jaw defining a slot therebetween; and a contact surface configured to continuously engage a peripheral edge of the brace member.

Also disclosed is a fitting for engaging a brace member, the fitting comprising a fitting body; a first jaw extending from the fitting body; a second jaw extending from the fitting body, a first contact surface defined between the first and second jaw and configured to engage a first location on a peripheral edge of the brace member; and a lip extending from the fitting body, the lip defining a second contact surface configured to engage a second location on the peripheral edge of the brace member.

Also disclosed is a method for attaching a fitting to a brace member, comprising inserting a portion of a wall of the brace member between a first and a second jaw of the fitting, the wall defining a peripheral edge; abutting a first portion of the peripheral edge against a first contact surface of the fitting; abutting a second portion of the peripheral edge against a second contact surface of the fitting; and attaching the fitting to the brace member with a fastener.

Another fitting for engaging a brace member is disclosed, the fitting comprising a fitting body; a first jaw extending from the fitting body; a second jaw extending from the fitting body, the first jaw and second jaw defining a slot therebetween; and a continuous contact surface defining a top contact surface, a bottom contact surface, a left contact surface, and a right contact surface, the continuous contact surface configured to continuously engage a peripheral edge of the brace member.

Also disclosed is a fitting for engaging a brace member, wherein the fitting comprises a fitting body; a body opening extending laterally through the fitting body; a first jaw extending from the fitting body perpendicular to the body opening; and a second jaw extending from the fitting body perpendicular to the body opening.

A method for attaching a brace member to a mounting bracket is also disclosed, the method comprising inserting a portion of the brace member between a first and a second jaw of a fitting, the brace member defining a peripheral edge; abutting an entirety of the peripheral edge against a continuous contact surface of the fitting; attaching the fitting to the brace member with a first fastener; and attaching the fitting to a mounting bracket with a second fastener.

Disclosed is a fitting for engaging a brace member comprising a fitting body defining a body opening extending laterally therethrough, the fitting body further defining a top contact surface and a bottom contact surface; a first jaw connected to the fitting body at a proximal first jaw end, the first jaw oriented perpendicular to the body opening; a second jaw connected to the fitting body at a proximal second jaw end, a the second jaw perpendicular to the body opening and disposed between the top contact surface and the bottom contact surface, wherein the top contact surface extends between the proximal first jaw end and the proximal second jaw end; and a slot defined between the first jaw and the second jaw.

Also disclosed is a method of attaching a brace member to a mounting bracket, comprising providing a fitting comprising a fitting body, a first jaw, and a second jaw, the fitting body defining a top contact surface and a bottom contact surface, the second jaw disposed between the upper and bottom contact surfaces; abutting a top side of a peripheral edge of the brace member against the top contact surface and abutting a bottom side of the peripheral edge against the bottom contact surface; coupling the fitting to the brace member; extending a fastener through a lateral body opening of the fitting body, the lateral body opening oriented perpendicular to the first jaw and the second jaw; and attaching the fitting to the mounting bracket with the fastener.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

FIG. 10 is an end view of the fitting of FIG. 1 in engagement with the brace member of FIG. 3.

FIG. 11A is an end view of the fitting of FIG. 1 in engagement with the brace member of FIG. 3, wherein the brace member is shown as transparent.

FIG. 11B is an end view of the fitting of FIG. 1 in engagement with another brace member having a generally square cross-sectional shape, wherein the brace member is shown as transparent.

DETAILED DESCRIPTION

Figure 1:
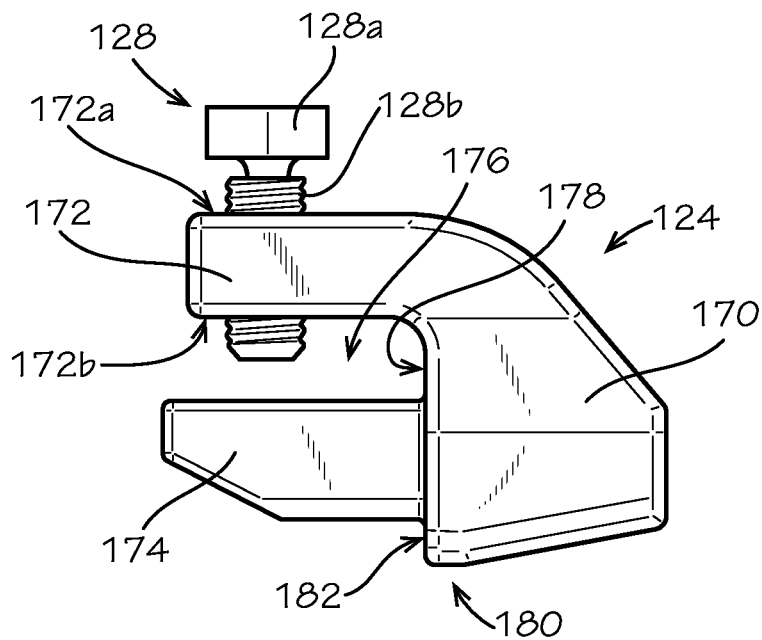
FIG. 1 shows a side view of a fitting, in accordance with one aspect of the present disclosure.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed in the present application is a fitting and associated methods, systems, devices, and various apparatus. Example aspects of the fitting can comprise a body, a first jaw, a second jaw, and a lip. The fitting can be configured to engage a brace member comprising a peripheral edge at at least two locations along the peripheral edge. It would be understood by one of skill in the art that the disclosed fitting is described in but a few exemplary embodiments among many. No particular terminology or description should be considered limiting on the disclosure or the scope of any claims issuing therefrom.

FIG. 1 illustrates a first aspect of a fitting 124 according to the present disclosure. Example aspects of the fitting 124 can be a seismic fitting. As shown, the fitting 124 can comprise a fitting body 170, a first jaw 172 extending from the fitting body 170, and a second jaw 174 extending from the fitting body 170. The first jaw 172 and second jaw 174 can be fixed in a spaced relationship to define a slot 176 therebetween. Example aspects of the slot 176 can comprise a closed end wall 178. As shown, example aspects of the end wall 178 can be formed by the fitting body 170. The fitting 124 can further comprise a lip 180 coupled to and extending from the fitting body 170. Example aspects of the lip 180 can comprise a lip wall 182, and the lip wall 182 can be spaced apart from the end wall 178 of the slot 176. The fitting 124 can be formed from any material or combinations of materials of suitable strength, including, but not limited to, metals and plastics. In particular, the fitting body 170, first jaw 172, second jaw 174, and lip 180 can be defined in a single monolithic structure, and can be formed from cast iron or other cast material. In other aspects, any of the fitting body 170, first jaw 172, second jaw 174, and lip 180 can be separate components that are coupled to the other components of the fitting 124.

The first and second jaws 172, 174 can be oriented generally parallel to one another and can extend in a first direction (e.g., horizontally) from the fitting body 170. Thus, the slot 176 defined by the first and second jaws 172, 174 can also extend in the first direction. The lip 180 can extend in a second direction (e.g., vertically) from the fitting body 170, and in example aspects, the second direction can be substantially perpendicular to the first direction. Further, according to example aspects, such as the aspect depicted in FIG. 1, the first jaw 172 can be oriented above the second jaw 174, and both the first and second jaws 172, 174 can be oriented above the lip 180. It will be appreciated, however, that in other aspects, the directions and orientations of the first jaw 172, second jaw 174, and lip 180 can be different.

The lip wall 182 of the lip 180 and the end wall 178 of the slot 176 can be formed as generally planar surfaces; however, other example aspects of the end wall 178 and the lip wall 182 may not be planar. Further, the lip wall 182 and the end wall 178 of the slot 176 can be coplanar with one another. As shown, example aspects of the lip wall 182 and the end wall 178 can extend generally vertically relative to the orientation shown and can be coplanar in the same vertical plane. Moreover, the end wall 178 of the slot 176 can be oriented above the lip wall 182 of the lip 180, relative to the orientation shown, though it will be appreciated by one skilled in the art that the orientation can be different.

Figure 2:
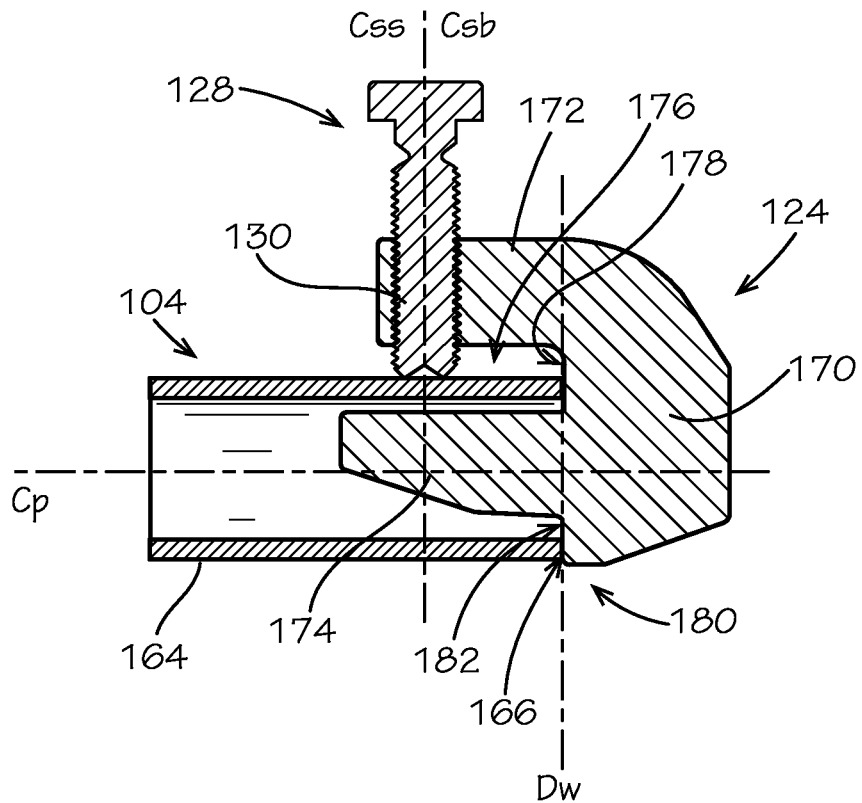
FIG. 2 is a cross-sectional view of the fitting of FIG. 1 in engagement with a brace member and taken along line 2-2 in FIG. 10.

As illustrated in FIG. 2, the fitting 124 can be configured to engage a brace member 104. For example, the fitting 124 can be a seismic fitting configured to engage the brace member 104. Example aspects of a brace member can include pipes, tubes, struts, strut channels, angle irons, flat stock, and other brace members known in the art. The brace member 104 can be formed as a hollow cylindrical tube comprising a cylindrical sidewall 164 comprising at least one open end. The open end can be defined by a peripheral edge 166. Some example aspects of the brace member 104 can define a circular cross-section, while other example aspects of the brace member 104 can define an oval cross-section or any other desired shape. The brace member 104 can be formed from any material, or combination of materials, that are known in the art, including but not limited to metal, plastic, resin, synthetic materials, and fibers. In some aspects, the brace member 104 can be extruded steel, for example and without limitation. In one aspect, the lip wall 182 and end wall 178 can extend in a direction $D_w$ that is perpendicular to a centerline $C_p$ of the brace member 104, when the brace member 104 is engaged with the fitting 124.

The slot 176 formed in the fitting 124 can be sized and shaped to receive a portion of the cylindrical wall 164 at the open end of the brace member 104. As shown, the second jaw 174 can extend through the open end of the brace member 104 and can be positioned within the hollow interior, the hollow interior of the brace member 104 being suitably sized to receive the second jaw 174. The first jaw 172 can be positioned outside of the brace member 104, as shown. The peripheral edge 166 of the brace member 104 can abut the end wall 178 of the slot 176 at a first location along the peripheral edge 166. As best seen in FIG. 2, according to one example aspect, the slot 176 can engage a top side of the pipe sidewall 164, and the end wall 178 of the slot 176 can abut a corresponding top side of the first peripheral edge 166.

The lip wall 182 of the lip 180 can abut the peripheral edge 166 of the brace member 104 at a second location along the peripheral edge 166 that is different from the first location. In the depicted aspect, the end wall 178 of the slot 176 and the lip wall 182 of the lip 180 can be configured to engage opposing portions of the peripheral edge 166. For example, as best shown in FIG. 2, the end wall 178 of the slot 176 can abut a top side of the peripheral edge 166, and the lip wall 182 of the lip 180 can abut a bottom side of the peripheral edge 166 that is positioned directly opposite the top side of the peripheral edge 166. Engaging opposing sides of the peripheral edge 166 of the brace member 104 distributes the load carried by the brace member 104 along the pipe's centerline $C_p$, so that the load is concentric to the brace member 104. Loading a brace member 104 concentrically can improve the load-carrying capability of the brace member 104, eliminating twisting forces on the fitting 124 and the brace member 104.

The fitting 124 can further comprise a fastener for securing the fitting 124 to the brace member 104. In example aspects, the fitting 124 can comprise a set screw 128 for attaching the fitting 124 to an open end of the brace member 104. An example set screw 128 can comprise a hexagonal head end 128a and a cylindrical threaded tail end 128b, as shown. A set screw bore 130 can be defined in the first jaw 172 of the fitting 124, extending from an upper surface 172a of the first jaw 172 to a lower surface 172b of the first jaw 172. The set screw bore 130 can be threaded to match the threading on the set screw 128, allowing the set screw 128 to be screwed into the set screw bore 130. Referring to the example aspect of FIG. 2, a centerline axis $C_{sb}$ of the set screw bore 130 is generally perpendicular to the centerline axis $C_p$ of the brace member 104, and as such, a centerline axis $C_{ss}$ of the set screw 128 is generally perpendicular to the centerline axis $C_p$ of the brace member 104.

The set screw 128, when threaded into the set screw bore 130, can move towards the second jaw 174 and can bias the portion of the cylindrical sidewall 164 received within the slot 176 towards the second jaw 174. The set screw 128 can be sufficiently tightened such that the sidewall 164 is clamped between the set screw 128 and the second jaw 174, preventing movement and removal of the brace member 104 with respect to the fitting 124. In various aspects, additional or other fasteners can be used for attaching the fitting 124 to the brace member 104; for example, clips, rivets, snaps, adhesive, welds, or any other fastener known in the art.

Figure 3:
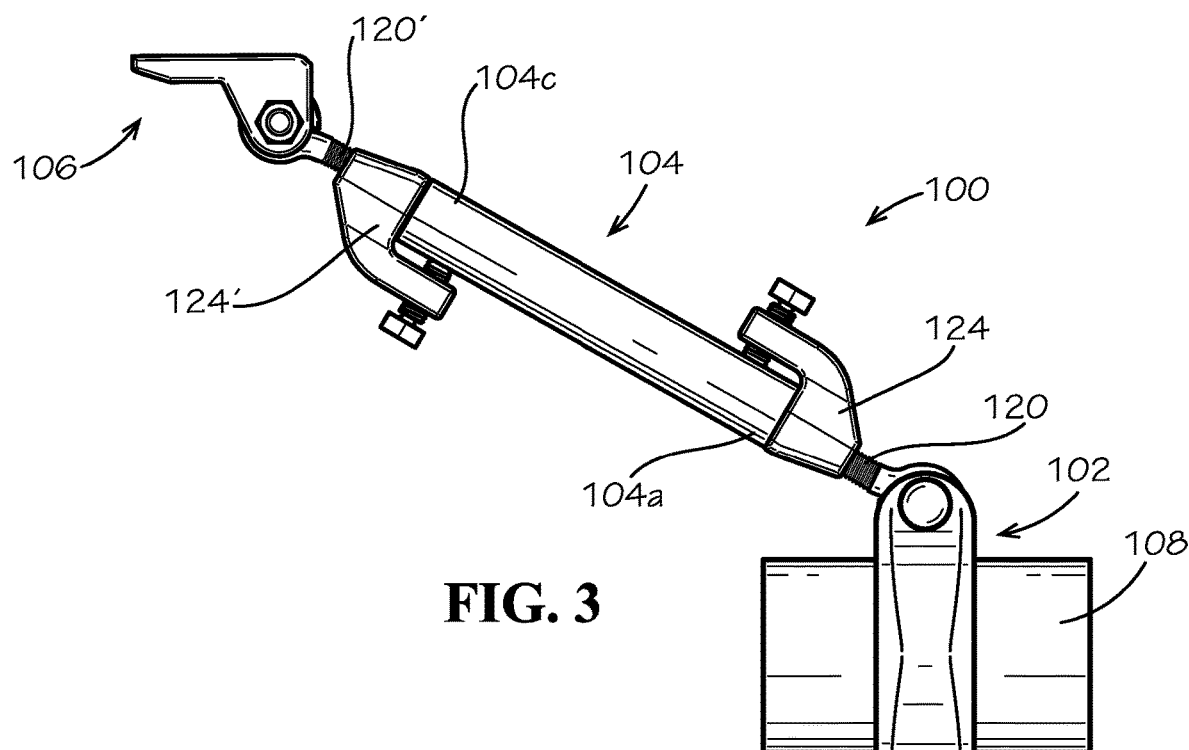
FIG. 3 shows a side view of a seismic brace assembly comprising a pair of the fittings of FIG. 1, a pipe clamp, a brace member, and a mounting bracket, in accordance with one aspect of the present disclosure.

Also disclosed in the present application is a pipe support assembly 100 utilizing the fitting 124 of FIGS. 1 and 2. FIG. 3 illustrates a first aspect of a pipe support assembly 100, according to the present disclosure. The pipe support assembly 100 can comprise a pipe clamp 102, a brace member 104, and a mounting bracket 106 and can be configured for mounting a pipe 108 or piping system to a structure (e.g., a building). In example aspects, the brace member 104 can extend between the pipe clamp 102 and the mounting bracket 106, and the distance between the pipe clamp 102 and the mounting bracket 106 can be selectively adjustable. Moreover, example aspects of the brace member 104 can be configured for rotational motion with respect to the pipe clamp 102 and/or the mounting bracket 106.

Figure 4:
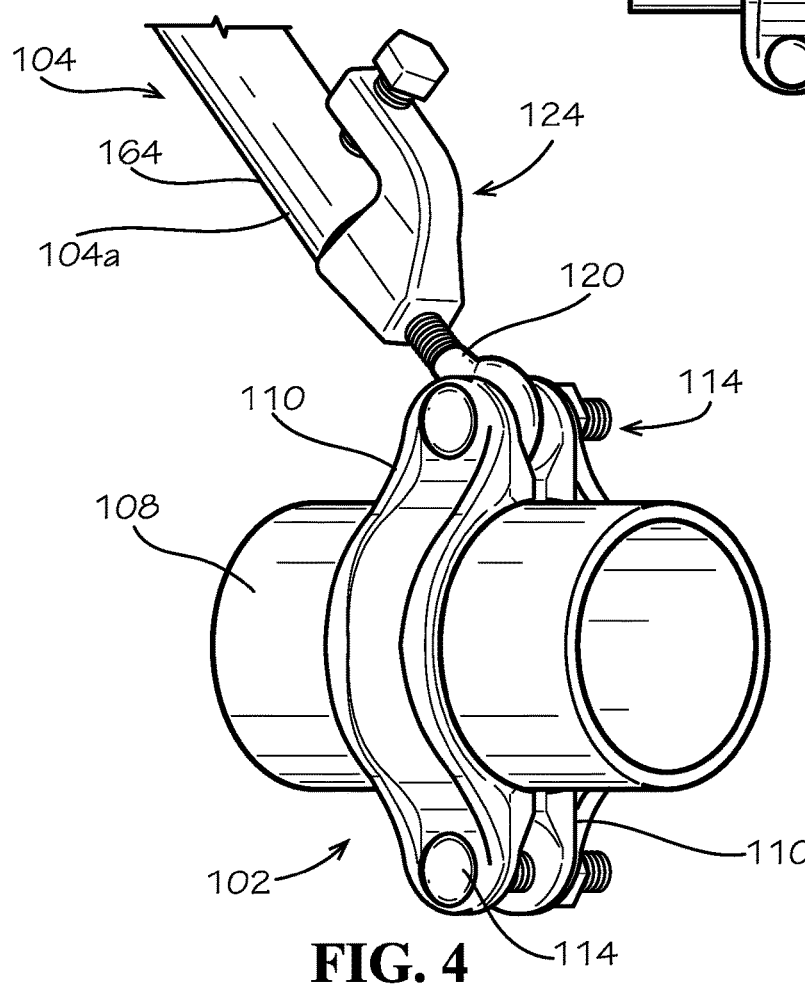
FIG. 4 is a perspective view of the pipe clamp of FIG. 3 in engagement with a pipe.

FIG. 4 illustrates an example aspect of a pipe clamp 102. The pipe clamp 102 can engage and support a pipe 108 of a piping system, such as, for example, an indoor water sprinkler system. Pipe clamp 102 can comprise two C-shaped halves 110, each defining an outer surface and an inner surface. Inner surfaces of the C-shaped halves 110 define a clamp channel 112 (shown in FIG. 5) through which the pipe 108 is received. According to example aspects, C-shaped halves 110 are formed from a metal material, such as steel or cast iron, including ductile iron in some aspects. In other example aspects, C-shaped halves 110 can be formed from any material, or a combination of materials, that are known in the art, including but not limited to, metal, plastic, resin, synthetic materials, and fibers.

Figure 5:
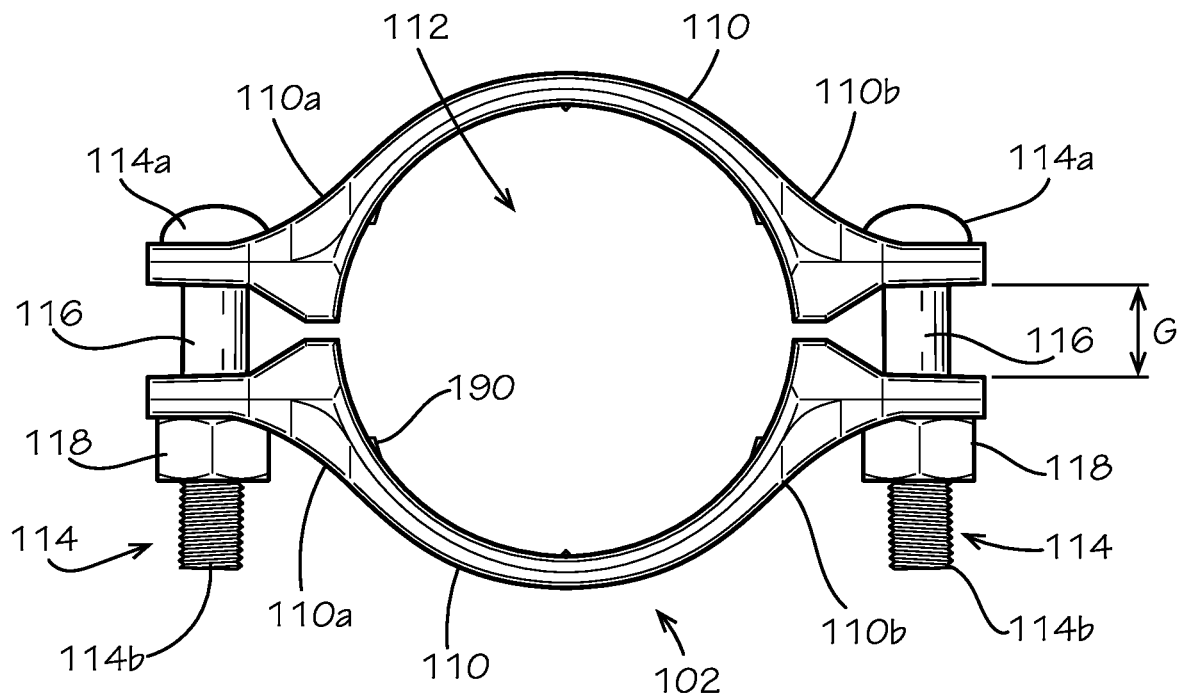
FIG. 5 is a front view of the pipe clamp of FIG. 3.

As shown in FIGS. 4 and 5, C-shaped halves 110 can be coupled together by fasteners 114. Fasteners 114 can be tightened such that the interior surfaces of the C-shaped halves 100 engage an outer surface of the pipe 108 at a desired strength. While two fasteners 114 are shown, each at an opposing end of the C-shaped halves 110, any number of fasteners 114 can be used. Fasteners 114 can be, for example, track bolts, as shown in the figures. Example aspects of the track bolt fasteners 114 can be generally mushroom-shaped, comprising a dome-shaped head end 114a and a cylindrical threaded tail end 114b extending therefrom. As shown, the C-shaped halves 110 can each comprise a first end 110a and an opposing second end 110b. Threaded openings (not shown) are formed in the first and second ends 110a,100b of the C-shaped halves 110. The threaded tail end 114b of each fastener 114 can be configured to thread through the corresponding threaded openings in the C-shaped halves 110. In other aspects, the openings formed in the C-shaped halves 110 of the pipe clamp 102 are not threaded. Each fastener 114 can be secured to the C-shaped halves 110, and thus the C-shaped halves 110 can be secured to one another, by coupling a mating threaded nut 118 to the threaded tail end 114b of the fastener 114. The nut 118 can be tightened against the pipe clamp 102 as desired to reach a preferred engagement strength between the pipe clamp 102 and the pipe 108. The fastener 114 and nut 118 can be formed from any suitable material, including, but not limited to, metal and plastic. Further, in other aspects, the fasteners 114 can be clips, rivets, snaps, adhesive, welds, or any other fastener known in the art.

As shown, the C-shaped halves 110 are secured together such that the first ends 110a of the C-shaped halves 110 face one another, and the second ends 110b of the C-shaped halves 110 face one another. In example aspects, as shown in FIG. 5, a gap G can be formed between each of the first ends 110a and the second ends 110b of the C-shaped halves 110, with an intermediate portion of a threaded tail end 114b of a corresponding fastener 114 extending through the gap G. Example aspects of the pipe clamp 102 can comprise spacers (not shown) positioned over the intermediate portions of the threaded tail ends 114b of the fasteners 114 to maintain a predetermined space between the C-shaped halves 110.

Inner surfaces of the C-shaped halves 110 and/or outer surface of the pipe 108 can comprise features for improving the grip between the pipe clamp 102 and the pipe 108 for a more secure engagement between the pipe clamp 102 and the pipe 108. For example, C-shaped halves 110 can comprise a gasket and/or teeth 190 configured to grip the pipe 108 received within the clamp channel 112. The improved grip aids in preventing the pipe 108 from moving with respect to the pipe clamp 102.

According to example aspects, the profile of the clamp channel 112 can be defined by the inner surfaces of C-shaped halves 110 and can be formed to substantially match the profile of the pipe 108. For example, as depicted, the pipe 108 can define a substantially circular cross-sectional shape, and the clamp channel 112 formed by the C-shaped halves 110 can also define a substantially circular cross-sectional shape. However, in other aspects, the channel 112 of the pipe clamp 102 can be formed with any desired cross-sectional shape, such as, for example, oval, square, rectangular, triangular, trapezoidal, pentagonal, etc., to match varying cross-sectional shapes of piping. Moreover, the clamp channel 112 can be sized to accept the pipe 108 therein, and the size of the clamp channel 112 can be adjusted to substantially match, or be just slightly larger than, the size of the outer periphery of the pipe 108. This adjustment can be achieved by the appropriate tightening of the threaded nuts 118 on the threaded tail end 114b of the fasteners 114 until the clearance between the outer surface of the pipe 108 and the inner surfaces of the C-shaped halves 110 is minimal.

Figure 6:
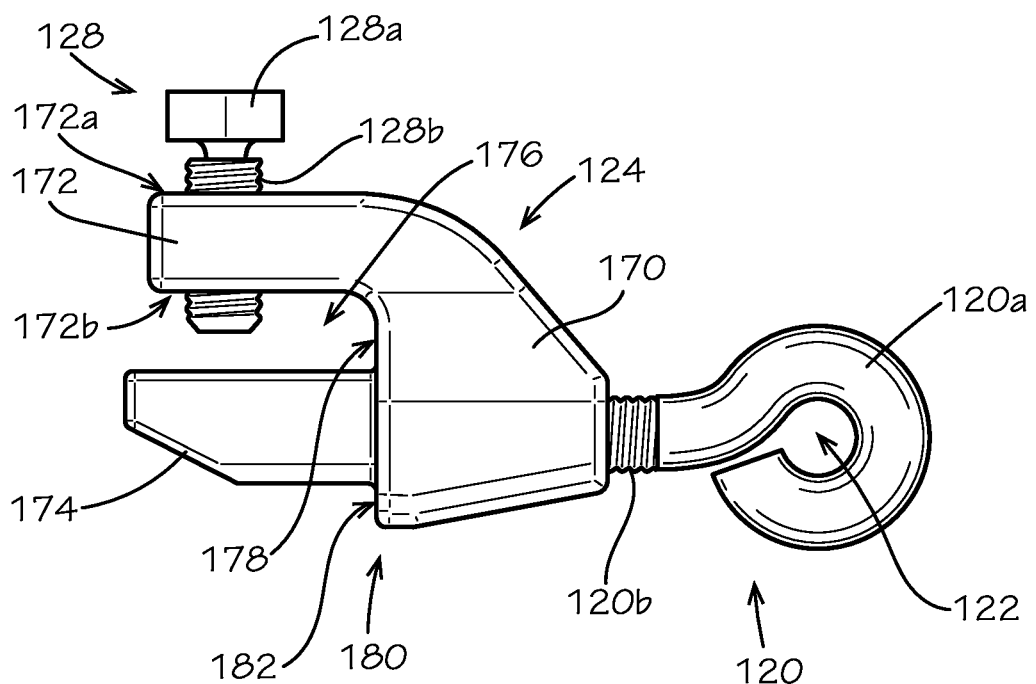
FIG. 6 shows a side-view the fitting of FIG. 1 in engagement with a fastening device.

Referring to FIG. 6, the pipe support assembly 100 can comprise a first fastening device 120. The first fastening device 120 can be, for example, an eyebolt. As shown, the first fastening device 120 can comprise a generally O-shaped head end 120a and a cylindrical threaded tail end 120b extending therefrom. The O-shaped head end 120a can define an opening 122 sized and shaped to receive a portion of a fastening device 114 (e.g. a track bolt) of the pipe clamp 102. As shown in FIGS. 4 and 5, in example aspects, the O-shaped head end 120a can be sized and positioned to receive the intermediate portion of a fastener 114 that is positioned within gap G. Gap G can be sized to accommodate the O-shaped head end 120a of the fastening device 120, with a large enough clearance between the fastening device 120 and the pipe clamp 102 to allow the fastening device 120 to rotate freely relative to the clamp 102. As will be described in more detail below, the rotational attachment of the fastening device 120 to the pipe clamp 102 also allows for movement of the brace member 104 relative to the pipe clamp 102. Example aspects can comprise a bearing 116 positioned between the intermediate portion of the fastener 114 and the O-shaped head end 120a of the fastening device 120 to reduce friction between the fastening device 120 and fastener 114 as the fastening device 120 rotates relative to the pipe clamp 102. Note that, in different aspects, other connectors can be employed to allow for rotation of the fastening device 120 with respect to the pipe clamp 102, such as, for example, a swivel bolt.

Figure 7:
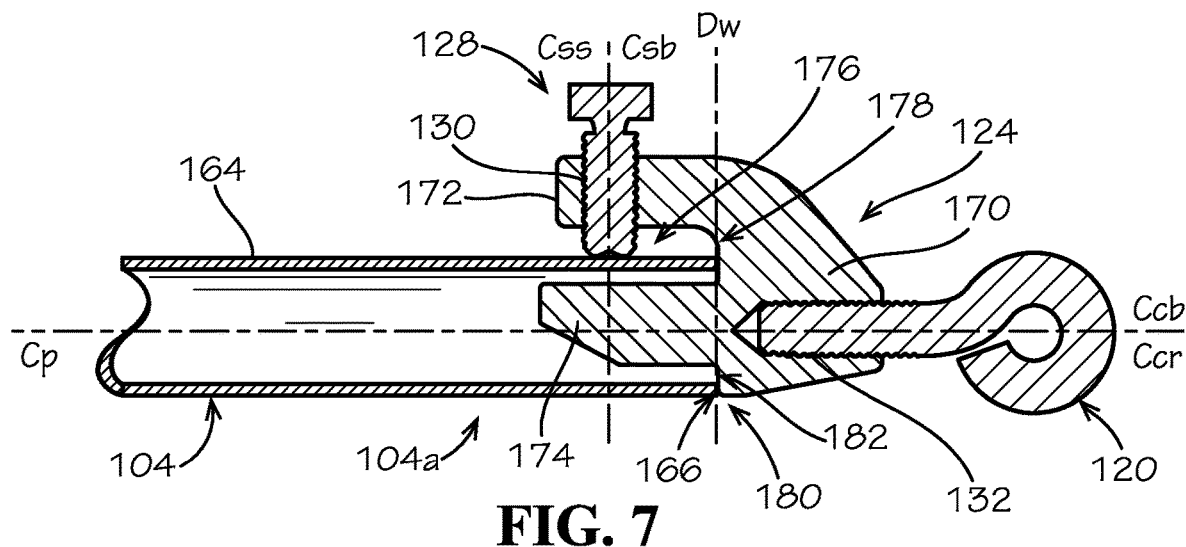
FIG. 7 shows a cross-sectional view of the fitting of FIG. 1 and fastening device of FIG. 6 in engagement with the brace member of FIG. 3 and taken along line 2-2 in FIG. 10.

As shown in FIG. 7, the brace member 104 can be attached to the fastening device 120. The brace member 104 can be formed from any material, or combination of materials, that are known in the art, including but not limited to metal, plastic, resin, synthetic materials, and fibers. The brace member 104 can be, for example, a one-inch Schedule 40 steel pipe defining a circular cross section. In other aspects, the brace member 104 can be another type, size and/or shape of pipe or another type of brace that is known in the art.

The pipe support assembly 100 can comprise a first fitting 124 configured for coupling a proximal end 104a of the brace member 104 to the first fastening device 120. The fitting 124 can comprise a fitting body 170, a first jaw 172 extending from the fitting body 170, and a second jaw 174 extending from the fitting body 170. The first jaw 172 and second jaw 174 can be fixed in a spaced relationship to define a slot 176 therebetween. Example aspects of the slot 176 can define a closed end wall 178 formed by the fitting body 170, as shown, or formed by another part of the fitting 124. The first fitting 124 can also comprise a lip 180 extending from the fitting body 170, the lip 180 defining a lip wall 182. As shown in FIGS. 6 and 7, the first and second jaws 172, 174 can be oriented generally parallel to one another and can extend in a first direction from the fitting body 170. The lip 180, the lip wall 182, and the end wall 178 of the slot 176 can extend in a second direction from the fitting body 170, and in example aspects, the second direction can be substantially perpendicular to the first direction. According to example aspects, the lip wall 182 and the end wall 178 can be spaced apart and aligned in the same plane, as shown. Further, as shown, the lip wall 182 and end wall 178 can extend in a direction $D_w$ that is perpendicular to the centerline $C_p$ of the brace member 104. The first fitting 124 can be formed from any material of suitable strength, including, but not limited to, metals and plastics.

The slot 176 of the first fitting 124 can be sized and shaped to receive a portion of the cylindrical wall 164 at the proximal end 104a of the brace member 104. The second jaw 174 can extend through the first open end of the brace member 104 and be oriented within the hollow interior of the brace member 104, and the first jaw 172 can be oriented outside of the brace member 104. When the cylindrical wall 164 of the brace member 104 is received within the slot 176, the first peripheral edge 166 of the brace member 104 can abut the closed end wall 178 of the slot 176 at a first location along the first peripheral edge 166. As best seen in FIG. 7, according to an example aspect, the slot 176 can engage a top side of the cylindrical sidewall 164 of the brace member 104 and the end wall 178 of the slot 176 can abut a corresponding top side of the first peripheral edge 166.

The lip wall 182 of the lip 180 can abut the first peripheral edge 166 of the brace member 104 at a second location along the peripheral edge 166 that is different from the first location. Further, end wall 178 of the slot 176 and the lip wall 182 of the lip 180 can be configured to engage opposing locations on the first peripheral edge 166 of the brace member 104. For example, as shown in FIG. 7, the end wall 178 of the slot 176 can abut a top side of the peripheral edge 166, and the lip wall 182 of the lip 180 can abut a bottom side of the first peripheral edge 166 that is positioned directly opposite the top side of the peripheral edge 166, such that the first fitting 124 engages the first peripheral edge 166 of the brace member 104 at two opposing locations. Engaging opposing locations of the first peripheral edge 166 of the brace member 104 distributes the load carried by the brace member 104 along the centerline $C_p$ of the brace member 104, so that the brace member 104 is concentrically loaded. Concentric loading of a brace member 104 can improve the load-carrying capability of the pipe support assembly 100, eliminating various undesirable forces on the fitting 124, the brace member 104, and the mounting bracket 106. Example aspects of the fitting 124 can engage the peripheral edge 166 of the brace member 104 at additional locations, such that the peripheral edge 166 of the pipe is contacted at three locations, four locations, or any other number of locations as desired. In the aspect depicted herein, the fitting can engage the entire peripheral edge of the pipe, as is shown in FIGS. 10 and 11. In other aspects, the fitting can engage the peripheral edge of the pipe at a plurality of spaced apart locations.

FIGS. 10 and 11A illustrate an end view of the fitting 124 engaged with the brace member 104. In FIG. 11A, the brace member 104 is transparent, such that the surfaces of the fitting 124 engaging the peripheral edge 166 of the brace member 104 are visible. As shown, the end wall 178 of the slot 176 can define a first contact surface 179 for engaging a top side 166a of the peripheral edge 166 of the brace member 104. The lip wall 182 of the lip 180 can define a second contact surface 183 for engaging a bottom side 166b of the peripheral edge 166. Furthermore, the fitting body 170 can define third and fourth contact surfaces 171,173 for engaging a left side 166c and a right side 166d, respectively, of the peripheral edge 166. As shown in the depicted aspect, the first, second, third, and fourth contact surfaces 179,183, 171,173 can be define a continuous contact surface 175 such that the entire peripheral edge 166 of the brace member 104 can be continuously engaged by the fitting 124. FIG. 11B illustrates the fitting 124 in continuous engagement with a peripheral edge 166b of another brace member 104b, wherein the brace member 104b can define a generally square cross-sectional shape. The brace member 104b is shown transparent so that a continuous contact surface 177b of the fitting 124 is visible.

Figure 12:
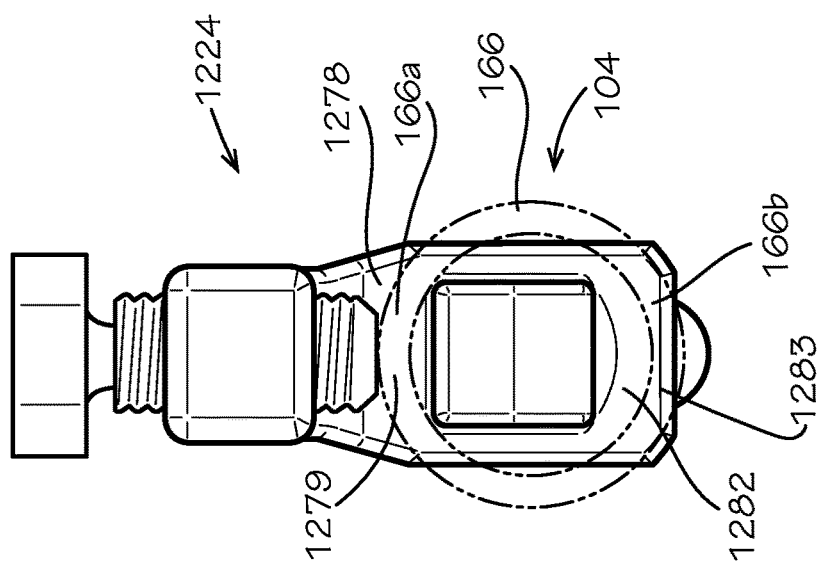
FIG. 12 is an end view of another aspect of a fitting according to the present disclosure in engagement with the brace member of FIG. 3, wherein the brace member is shown as transparent.

In other aspects, the various contact surfaces of the fitting 124 engaging the peripheral edge 166 of the brace member 104 can be spaced from one another, such that the peripheral edge 166 can be engaged at multiple spaced apart locations. For example, FIG. 12 illustrates another aspect of a fitting 1224 in accordance with the present disclosure, wherein the peripheral edge 166 of the pipe can be engaged at two locations. The end wall 1278 can define a first contact surface 1279, and the lip wall 1282 can define a second contact surface 1283 spaced apart from the first contact surface 1279. As shown, the first and second contact surfaces 1279,1283 can engage the top side 166a and the bottom side 166b, respectively, of the peripheral edge 166 of the brace member 104, and thus, the fitting 1224 can engage the peripheral edge 166 at two spaced apart locations.

Figure 13:
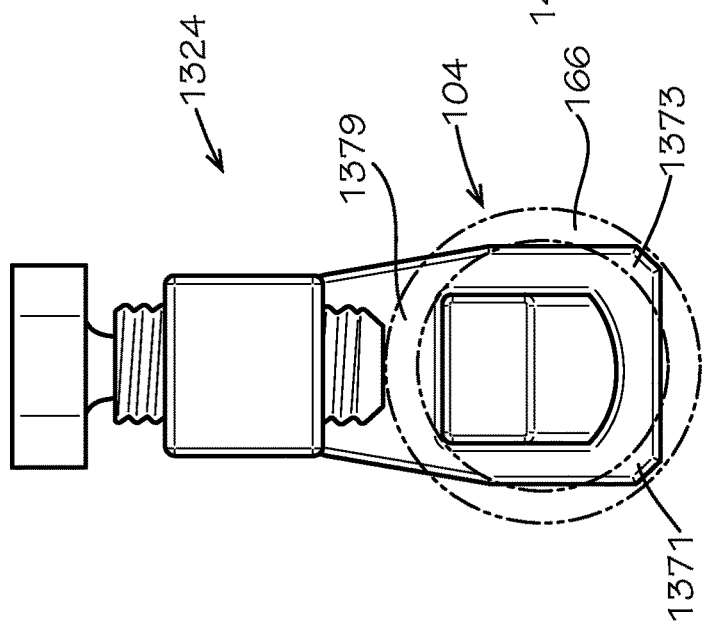
FIG. 13 is an end view of another aspect of a fitting according to the present disclosure in engagement with the brace member of FIG. 3, wherein the brace member is shown as transparent.

FIG. 13 illustrates another example aspect of a fitting 1324, in accordance with the present disclosure, wherein the peripheral edge 166 of the brace member 104 is engaged by the fitting 1324 at three spaced apart locations. As shown, the fitting 1324 can define a first contact surface 1379, a second contact surface 1371 spaced from the first contact surface 1379, and third contact surface 1373 spaced from both the first and second contact surfaces 1379,1371. As shown in FIG. 13, in some aspects, the contact surfaces 1379,1371,1373 can be un-equally spaced apart from one another. As shown in FIG. 12, is some aspects, the contact surfaces 1279, 1283 can be equally spaced.

Figure 14:
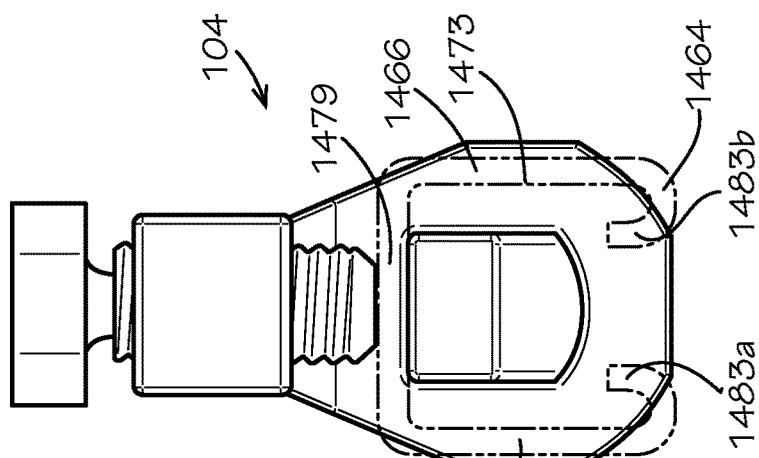
FIG. 14 is an end view of the fitting of FIG. 1 in engagement with a strut channel, wherein the strut channel is shown as transparent.

FIG. 14 illustrates the fitting 104 of FIG. 1 in engagement with the peripheral edge of a strut channel 1404. As shown, the fitting 104 can define a first contact surface 1479 for engaging a top side of a peripheral edge 1466 of the strut channel 1404, a second contact surface 1471 for engaging a left side of the peripheral edge 1466, and a third contact surface 1473 for engaging a right side of the peripheral edge 1466. The first, second, and third contact surfaces 1479, 1471,1473 can form a continuous contact surface 1477. The fitting 104 can further define fourth and fifth contact surfaces 1483a,b for engage opposing bottom sides of the peripheral edge 1466. As shown, the fourth and fifth contact surfaces 1483a,b can be spaced from the first, second, and third contact surfaces 1479,1471,1473, and from each other.

Referring back to FIG. 7, the first fitting 124 can comprise a set screw fastener 128 for attaching the first fitting 124 to the corresponding proximal end 104a of the brace member 104. An example set screw 128 can define a hexagonal head end 128a and a cylindrical threaded tail end 128b, as shown. A set screw bore 130 can be formed in the first jaw 172 of the fitting 124, extending from an upper surface 172a of the first jaw 172 to a lower surface 172b of the first jaw 172. The set screw bore 130 can be threaded to match the threading on the set screw 128, allowing the set screw 128 to be screwed into the set screw bore 130. Referring to the example aspect of FIG. 7, the centerline axis $C_{sb}$ of the set screw bore 130 is generally perpendicular to the centerline axis $C_p$ of the brace member 104, and as such, the centerline axis $C_{ss}$ of the set screw 128 is generally perpendicular to the centerline axis $C_p$ of the brace member 104.

The set screw 128, when threaded into the set screw bore 130, can move towards the second jaw 174 and can bias the portion of the cylindrical sidewall 164 received within the slot 176 towards the second jaw 174. The set screw 128 can be sufficiently tightened such that the sidewall 164 is clamped between the set screw 128 and the second jaw 174, preventing movement of the brace member 104 with respect to the first fitting 124. In various aspects, additional or other fasteners can be used for attaching the first fitting 124 to the proximal end 104a of the brace member 104; for example, clips, rivets, snaps, adhesive, welds, or any other fastener known in the art.

A fastener bore 132 can be formed in the fitting body 170 of the first fitting 124. In the current aspect, the fastener bore 132 is a blind hole. The fastener bore 132 can be threaded to match the threading on the tail end 120b of the first fastening device 120, allowing the fastening device 120 to be threaded with the fastener bore 132, and attaching the fastening device 120 to the fitting 124. In example aspects, a centerline axis $C_{fb}$ of the fastener bore 132 is substantially aligned with the centerline axis $C_p$ of the brace member 104, and as such, a centerline axis $C_{fd}$ of the first fastening device 120 is substantially aligned with the centerline axis $C_p$ of the brace member 104. In such an aspect, the first fastening device 120 and the brace member 104 are oriented concentrically with respect to one another.

Figure 8:
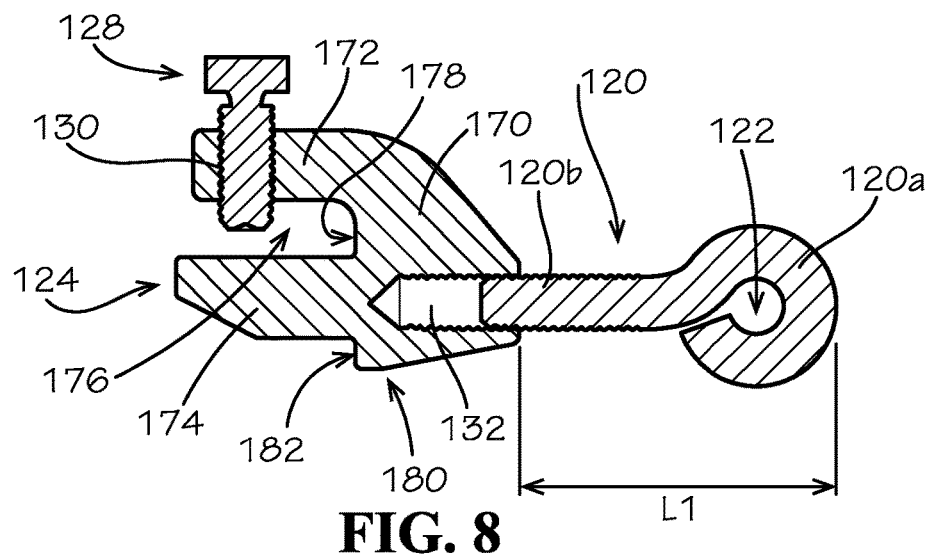
FIG. 8 is a cross-sectional view of the fitting of FIG. 1 and fastening device of FIG. 6 taken along line 2-2 in FIG. 10 and with the fastening device in a first position.
Figure 9:
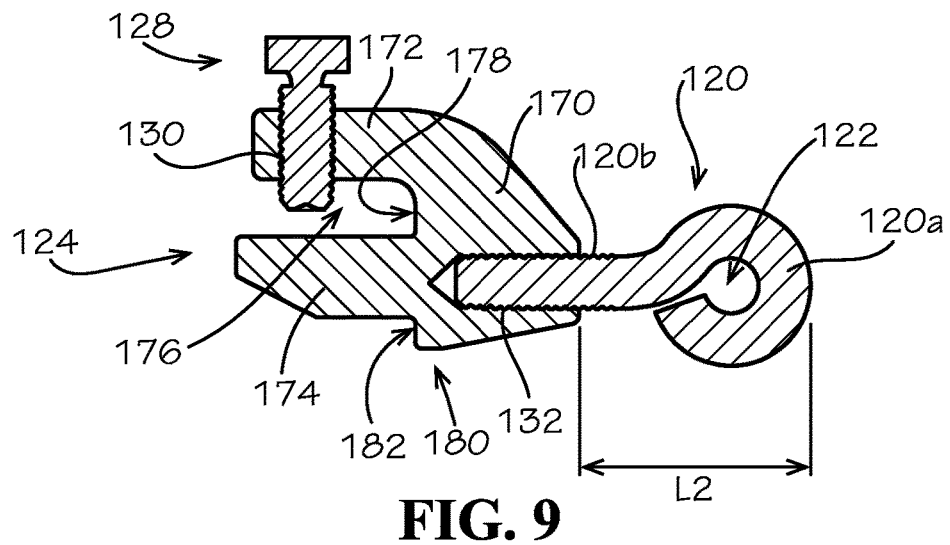
FIG. 9 is a cross-sectional view of the fitting of FIG. 1 and fastening device of FIG. 6 taken along line 2-2 in FIG. 10 and with the fastening device in a second position.

Referring to FIGS. 8 and 9, according to example aspects, the effective length of the first fastening device 120 is the distance between a distal end of the first fastening device 120 and the first fitting 124. The effective length of the first fastening device 120 can be selectively adjusting by adjusting the depth by which the threaded tail end 120b of the first fastening device 124 is threaded into the fastener bore 132. In FIG. 8, the first fastening device 120 is only partially threaded into the fastener bore 132 of the first fitting 124, with the effective length of the first fastening device 120 indicated by $L_1$. In FIG. 9, the first fastening device 120 is fully threaded into the fastener bore 132 of the first fitting 124, with the effective length of the first fastening device 120 indicated by $L_2$. As is illustrated, effective length $L_2$ is less than effective length $L_1$. Thus, the length of the pipe support assembly 100 can be selectively lengthened and shortened to fit the orientations of varying pipes and piping systems with respect to a mounting structure. It should be noted that, in various aspects, additional or other fastening devices can be used for attaching the pipe clamp 102 to the first fitting 124, provided that the fasteners allow for selective adjustment of the length of the pipe support assembly 100.

Figure 15:
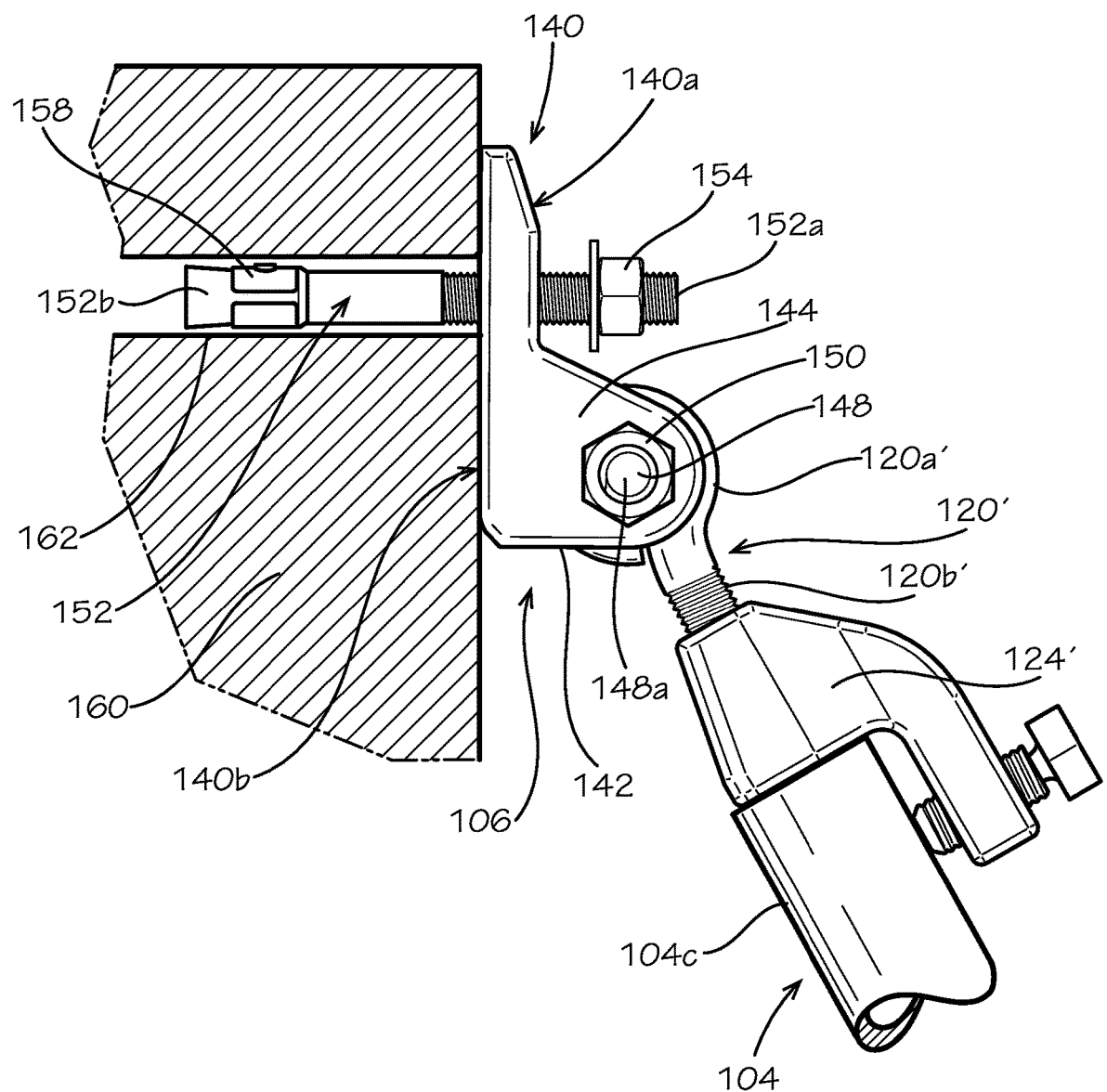
FIG. 15 is a side view of one of the pair of fittings of FIG. 3 in engagement with the mounting bracket of FIG. 3 and the brace member of FIG. 3, the mounting bracket attached to a wall.

Referring now to FIG. 15, the pipe support assembly 100 can comprise a second fitting 124' coupled to a distal end 104c of the brace member 104. The second fitting 124' can be substantially similar to the first fitting 124. The pipe support assembly 100 can further comprise a second fastening device 120' coupled to the second fitting 124'. The second fastening device 120' can be substantially similar to the first fastening device 120, and the method for coupling the second fastening device 120' to the second fitting 124' can be substantially similar to the method for coupling the first fastening device 120 to the first fitting 124. According to an example aspect, the second fastening device 120' and brace member 104 can be oriented concentrically with respect to one another. Further, the effective length of the second fastening device 120' can be selectively adjusted in a manner that is substantially similar to the adjustment of the first fastening device 120. Allowing for length adjustment at both ends of the brace member 104 increases the range of lengths that can be achieved by the pipe support assembly 100.

FIG. 15 also illustrates an example aspect of the mounting bracket 106, according to the present disclosure, that can be configured for mounting the pipe 108 to a structure (e.g., a building). In combination, the pipe clamp 102, brace member 104, and mounting bracket 106 can form the pipe support assembly 100, though it will be understood by one skilled in the art that other mounts, clamps, and bracing devices can be used in various aspects of the current disclosure. The pipe support assembly 100 can be mounted to any suitable mounting structure, such as, for example, a joist, a wooden beam or blocking, a steel beam, or a concrete wall, pillar, floor, or ceiling. In other aspects, the pipe 108 can be mounted to the structure with other mounting mechanisms known in the art, such as beam clamps. Undesirable prying or twisting forces on the mounting bracket 106 and/or the mounting structure can be reduced by concentrically loading the brace member 104 in the manner described above.

The mounting bracket 106 can comprise a mounting plate 140 configured to abut and engage a mounting structure, such as, for example, a concrete wall 160, wherein the concrete wall can be part of a larger structure, such as a building. The mounting bracket 106 further can comprise a protruding portion 142 extending from the mounting plate 140. The protruding portion 142 of the mounting bracket 106 can engage the second fastening device 120' to attached the brace member 104 and pipe clamp 102 to the mounting bracket 140.

The protruding portion 142 of the mounting bracket 106 can comprise opposing first and second side walls 144. Note, in the figures, only the first sidewall 144 is shown. Each side wall 144 can define an side wall opening (not shown) formed therein, the openings being horizontally aligned and configured to allow the passage of a fastener 148 through both sidewalls 144. The fastener 148 can be, for example, a cross bolt, as shown in the figures. Example aspects of the cross bolt fastener 148 can comprise a hexagonally-shaped head end (not shown) and a cylindrical threaded tail end 148a extending therefrom. The threaded tail end 148a of the cross bolt fastener 148 can pass through the openings in the side walls 144, with the hexagonal head end (not shown) abutting an outer surface of the second side wall (not shown). The cross bolt fastener 148 can be secured to the mounting bracket 106 by coupling a mating threaded nut 150 to the threaded tail end 148a of the cross bolt. The nut 150 can be tightened against the outer surface of the first side wall 144 of the mounting bracket 106, as shown. The openings formed in the side walls 144 can be threaded or unthreaded. The cross bolt fastener 148 and nut 150 can be formed from any suitable material, including, but not limited to, metal and plastic. In other aspects, the fastener 148 can be a clip, rivet, snap, adhesive, weld, another type of bolt, or any other fastener known in the art. Example aspects of the fastener 148 can further comprise a washer (not shown) positioned between the nut 150 and the outer surface of the first side wall 144 to aid in evenly distributing the pressure of the nut 150 and in preventing loosing of the nut 150. For example, the washer can be a lock washer comprising a plurality of teeth configured to engage opposing teeth on the nut 150. In other aspects, the washer can be a plain washer.

Interior surfaces of the two opposing side walls 144 of the mounting bracket 106 can be separated by a gap (not shown), with an intermediate portion of the cross bolt fastener 148 extending through the gap. According to example aspects, the second fastening device 120' can be rotatably coupled to the intermediate portion of the cross bolt fastener 148 in a manner that is substantially similar to the coupling of the first fastening device 120 to the track bolt fastener 114. Note that, in different aspects, other connectors can be employed to allow for rotation of the second fastening device 120' with respect to the mounting bracket 106, such as, for example, a swivel bolt.

The mounting plate 140 of the mounting bracket 106 can be coupled to the protruding portion 142 of the mounting bracket. Example aspects of the mounting plate 140 can define a front surface 140a and an opposite-facing rear surface 140b. The rear surface 140b of the mounting plate 140 can be configured to abut and engage a mounting structure, such as the concrete wall 160. According to the depicted aspect, the rear surface 140b can define a substantially flat profile to lie against and engage the substantially flat concrete wall 160. In other aspects, the rear surface 140b of the mounting plate 140 can define a non-flat profile. For example, the rear surface 140b can be curved to engage a curved mounting structure or angular to engage an angular mounting structure. The front surface 140a of the mounting plate 140 can be oriented opposite the rear surface 140b of the mounting plate 140, such that the front surface 140a faces away from the wall 160.

As is illustrated in FIG. 15, the mounting bracket 106 of the pipe support assembly 100 can be directly coupled to the concrete wall mounting structure 160. The mounting plate 140 of the mounting bracket 106 can define one or more through-holes (not shown) extending from the front surface 140a of the mounting plate 140 to the rear surface 140b. A concrete wedge anchor 152 for coupling the mounting bracket 106 to the concrete wall 160 can extend through the though-holes to engage the concrete wall 160. The concrete wedge anchor 152 can comprise a threaded rod portion 152a and an anchor portion 152b. The diameter of the anchor portion 152b tapers to a slightly smaller size away from the threaded portion 152a and then tapers back out to match the diameter of the threaded portion 152a at the end of the anchor portion 152b. A wedge clip 158 can be attached around the narrower section of the anchor portion 152b. The anchor portion 152b of the wedge anchor 152 and the wedge clip 158 can pass through the though-hole (not shown) in the mounting plate 140 and be inserted into a passage 162 in the concrete wall 160. In example aspects, the diameter of the passage 162 in the concrete wall 160 is substantially the same as the diameter of the anchor wedge 152 at its largest diameter. A nut 154 can be threaded onto the threaded portion 152a of the wedge anchor 152 and tightened against the front surface 140a of the mounting plate 140 to secure the mounting bracket 106 against the concrete wall 160. In example aspects, a washer (not shown)— for example, a plain washer or a lock washer, as described above—can be positioned between the nut 154 and the front surface 140a of the mounting plate 140 to aid in evenly distributing the pressure of the nut and in preventing loosing of the nut. As the nut 154 is tightened, the wedge anchor 152 is drawn partially out of the passage 162, wedging the wedge clip 158 between the wide end of the anchor portion 152b and the walls of the concrete passage 162. In other aspects, the mounting bracket 106 can be fastened to the concrete wall 160 using any other suitable fastener known in the art, such as, for example, bolts, clips, rivets, snaps, adhesives, or welds.

Figure 16:
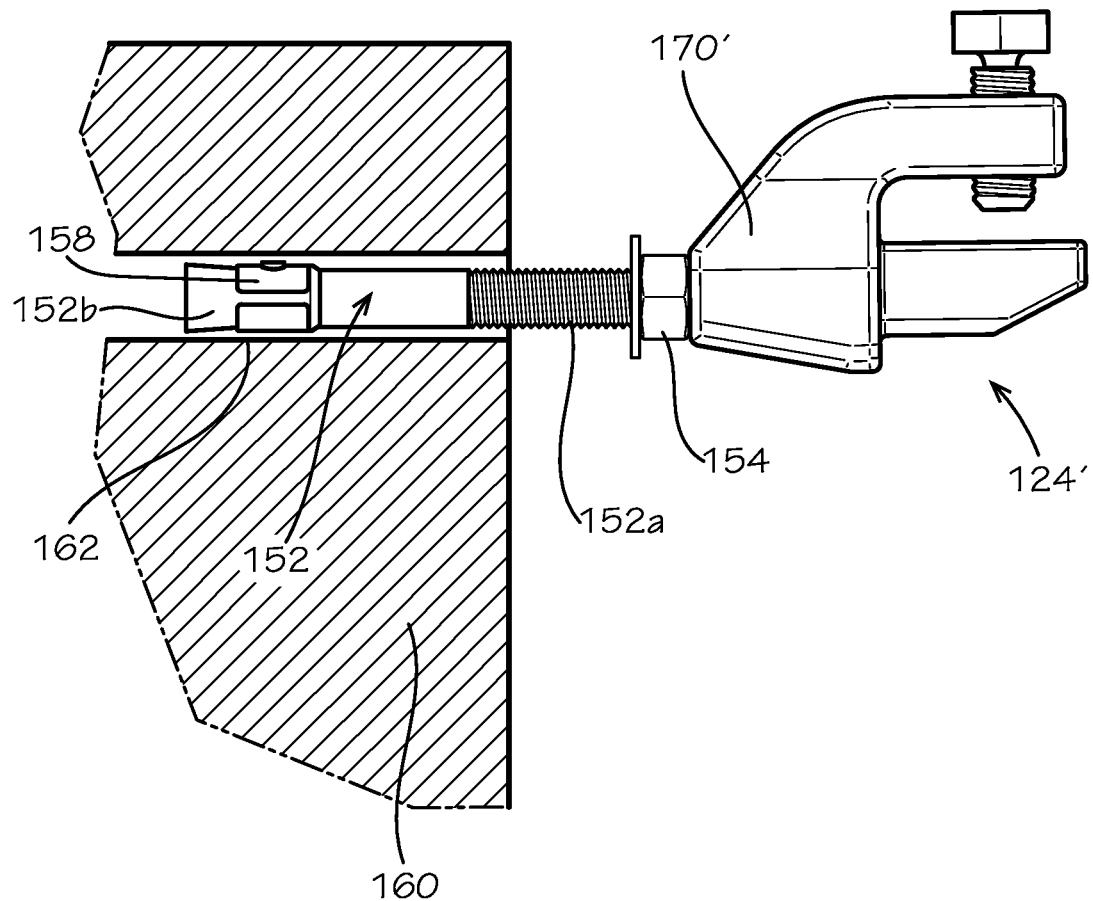
FIG. 16 illustrates the fitting of FIG. 15 in engagement with a concrete anchor, the concrete anchor attached to a wall, according to another aspect of the present disclosure.

According to other aspects of the current disclosure, the brace member 104 can be mounted directly to a mounting structure, without the need for a mounting bracket 106. For example, as shown in FIG. 16, the second fastening device 120' can be replaced with a concrete wedge anchor 152 for attaching the pipe support assembly 100 to a concrete wall 160. The concrete wedge anchor 152 comprises an anchor portion 152b that can be inserted into a passage 162 in the concrete mounting structure 160 and a threaded portion 152a that is threaded with the second fastener bore 132' of the second fitting 124'. A nut 154 can be threaded onto the threaded portion 152a and tightened against the concrete structure 160, wedging a wide end of the anchor portion 152b between a wedge clip 158 and the walls of the concrete passage 162. Example aspects can comprise a washer (not shown) that can be positioned between the nut 154 and the concrete wall 160 to aid in evenly distributing the pressure of the nut 154 and to help prevent loosing of the nut 154. In such an example aspect, the length of the pipe support assembly 100 can be selectively adjusted by threading and unthreading the first fastening device 120 with respect to the first fitting 124 and/or by threading and unthreading the threaded portion 152a of the concrete wedge anchor 152 with respect to the second fitting 124'.

Figure 17:
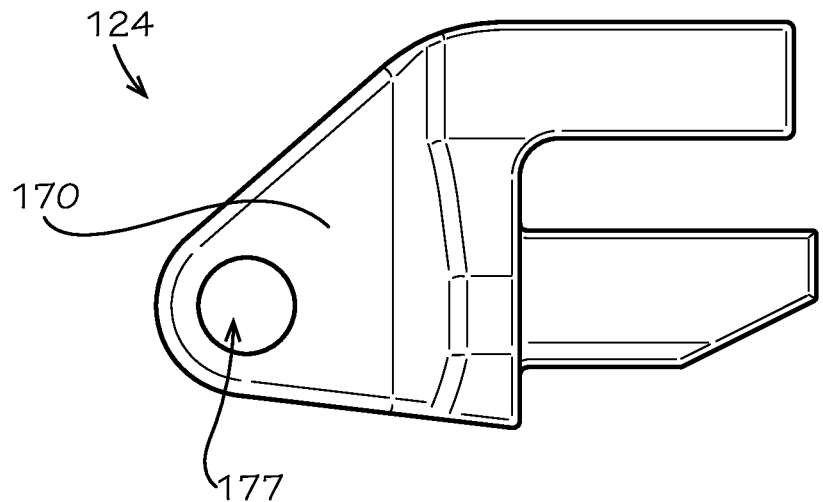
FIG. 17 illustrates a side view of another example aspect of a fitting according to the present disclosure.
Figure 18:
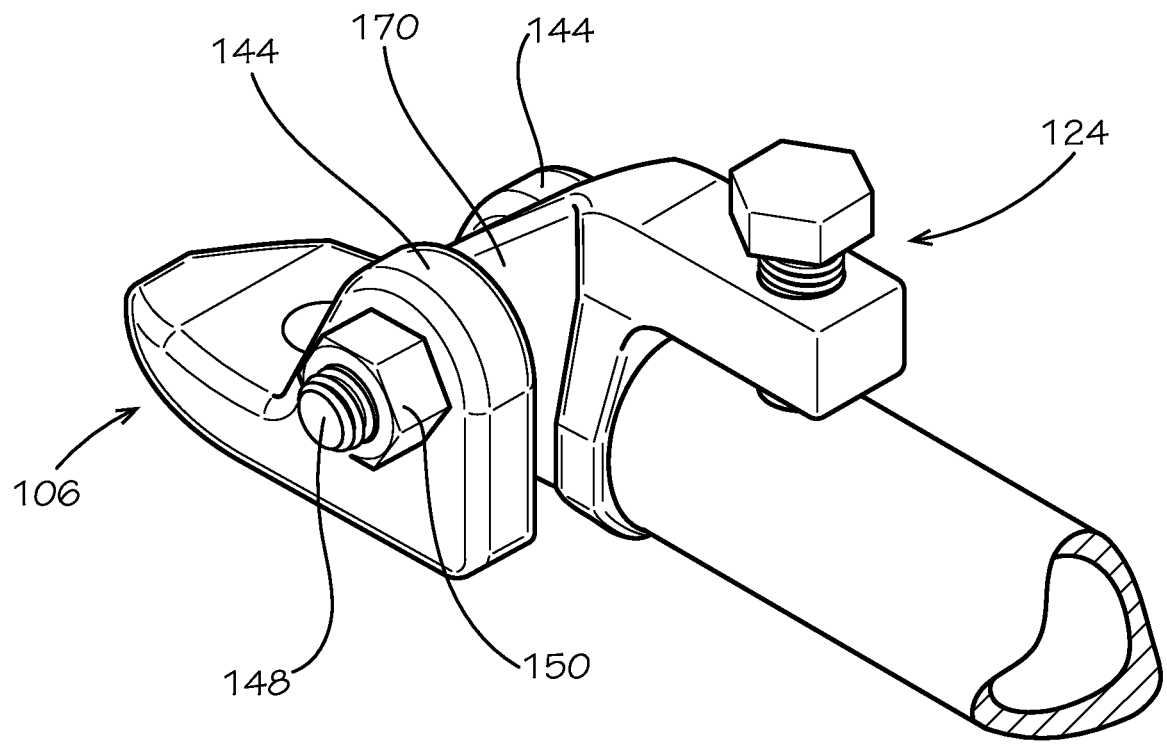
FIG. 18 illustrates a perspective view of the fitting of FIG. 17 in engagement with the mounting bracket of FIG. 3 and the brace member of FIG. 3.

FIG. 17 illustrates a side view of another aspect of the fitting 124, wherein the fitting 124 comprises a body opening 177 extending laterally through the fitting body 170. As shown in FIG. 18, the fitting body 170 can be positioned between the sidewalls 144 of the mounting bracket 106, and the body opening 177 (shown in FIG. 17) of the fitting body 170 can be aligned with the side wall openings (not shown) in the side walls 144. The fitting 124 can be coupled to the mounting bracket 106 by extending the cross bolt fastener 148 through the side wall openings and the body opening 177 and tightening the nut 150 on the cross bolt fastener 148.

As discussed above, example aspects of the fitting 124 of the present disclosure can be configured to engage a peripheral edge 166 of a brace member 104 at least first and second locations along the peripheral edge 166. The first and second locations can be disposed opposite from one another, such that the brace member 104 is loaded concentrically. In other aspects, the fitting 124 can engage a peripheral edge 166 of a brace member 104 at three or more locations. The three or more locations can be equally spaced from one another, such that the load carried by the brace member 104 is concentric to the brace member 104. In still other aspects, the fitting 124 can continuously engage the entire peripheral edge 166 of the brace member 104.

Also, according to an example aspect of the disclosure, the rotational coupling of the first fastening device 120 to the pipe clamp 102 allows the brace member 104 to move relative to the pipe clamp 102, and the rotational coupling of the second fastening device 120' to the mounting bracket 106 allows the brace member 104 to move relative to the mounting bracket 106. Such freedom of movement can be desired in instances of seismic events or other events that cause a structure to move (such as the settling of a building), as the pipe support system 100 can move along with the moving structure.

Moreover, as discussed above, the length of the example pipe support assembly 100 described and contemplated herein can be selectively lengthened and shortened. Such adjustability provides the desirable benefit of having a single pipe support assembly 100 design that is capable of supporting pipes 108 and piping systems positioned at varying distances from a mounting structure.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A fitting for engaging a brace member, the fitting comprising:
a fitting body defining a body opening extending laterally therethrough, the fitting body further defining a left contact surface, a right contact surface, a top contact surface, and a bottom contact surface, wherein the left, right, top, and bottom contact surfaces are coplanar;
a first jaw connected to the fitting body at a proximal first jaw end of the first jaw, the first jaw oriented perpendicular to the body opening;
a second jaw connected to the fitting body at a proximal second jaw end of the second jaw, the second jaw perpendicular to the body opening and disposed longitudinally between the top contact surface and the bottom contact surface, wherein the top contact surface extends between the proximal first jaw end and the proximal second jaw end, wherein the left contact surface is laterally spaced from the right contact surface, and wherein the second jaw extends from the fitting body laterally between the left contact surface and the right contact surface; and
a slot defined between the first jaw and the second jaw; wherein:
each of the left, right, top, and bottom contact surfaces are configured to contact a peripheral edge of the brace member;
the second jaw is configured to extend into a hollow interior of the brace member; and
the left contact surface, the right contact surface, the top contact surface, and the bottom contact surface together define a continuous contact surface, and wherein the continuous contact surface circumscribes the second jaw.

2. The fitting of claim 1, wherein the upper and bottom contact surfaces are substantially coplanar.

3. The fitting of claim 2, wherein the upper and bottom contact surfaces or oriented in a substantially vertical plane, and wherein the first jaw, the second jaw, and the body opening are oriented horizontally.

4. The fitting of claim 1, wherein the first jaw defines an upper surface and a lower surface opposite the upper surface, the lower surface facing the second jaw, a bore defined through the first jaw and extending from the upper surface to the lower surface.

5. The fitting of claim 4, further comprising a fastener extending through the bore of the first jaw and into the slot.

6. The fitting of claim 5, wherein the bore is a threaded bore and the fastener is a set screw rotationally engaged with the threaded bore, and wherein rotating the set screw in a first direction relative to the first jaw advances the set screw further into the slot, and rotating the set screw is a second direction relative to the first jaw retracts the set screw from the slot.

7. The fitting of claim 4, wherein the second jaw defines an upper surface and a lower surface, the upper surface facing the first jaw, wherein the slot is defined by the lower surface of the first jaw, the upper surface of the second jaw, and the top contact surface of the fitting body.

8. The fitting of claim 7, wherein the second jaw defines a distal second jaw end opposite the proximal second jaw end, and wherein the second jaw defines an inclined surface extending from the lower surface of the second jaw to the distal second jaw end.

9. The fitting of claim 1, wherein the second jaw defines a distal second jaw end opposite the proximal second jaw end, and wherein a height of the second jaw at the distal second jaw end is less than a height of the second jaw at the proximal second jaw end.

10. The fitting of claim 1, wherein the second jaw defines a length that is greater than the first jaw.

11. The fitting of claim 1, further comprising a fastener extending through the body opening of the fitting body, wherein the body opening is unthreaded.

12. The fitting of claim 1, wherein the second jaw defines a distal second jaw end opposite the proximal second jaw end and distal to the fitting body, wherein the distal second jaw end is configured to engage an open end of the brace member, and wherein a thickness of the second jaw tapers such that the thickness of the second jaw at the distal second jaw end is less than the thickness of the second jaw at the proximal second jaw end.

13. The fitting of claim 12, wherein the first jaw defines a distal first jaw end opposite the proximal first jaw end and distal to the fitting body, and wherein a thickness of the first jaw is substantially consistent between the proximal first jaw end and the distal first jaw end.

14. The fitting of claim 1, wherein the body opening is configured to receive a bracket fastener therethrough to couple a mounting bracket to the fitting body.

15. The fitting of claim 14, wherein at least a portion of the fitting body is configured to be received between a first side wall and a second side wall of the mounting bracket.

* * * * *